United States Patent [19]

Palazzi, III et al.

[11] Patent Number: 5,327,554
[45] Date of Patent: Jul. 5, 1994

[54] INTERACTIVE TERMINAL FOR THE ACCESS OF REMOTE DATABASE INFORMATION

[76] Inventors: Michael A. Palazzi, III, 17 Maple Way, Mountain Lakes, N.J. 07046; Frank A. Epps, III, 20 Bow St., East Greenwich, R.I. 02818

[21] Appl. No.: 619,412

[22] Filed: Nov. 29, 1990

[51] Int. Cl.⁵ ............................................. G06F 3/00
[52] U.S. Cl. .................... 395/600; 379/89; 379/96; 379/105; 364/222.3; 364/282.1; 364/284; 348/13
[58] Field of Search ............... 395/800, 325, 275, 600, 395/425, 200; 358/23, 83, 85; 379/90, 106, 96, 102, 109, 89; 369/47, 61, 176

[56] References Cited

U.S. PATENT DOCUMENTS

| | | | |
|---|---|---|---|
| 4,008,369 | 2/1977 | Theurer et al. | 358/84 |
| 4,150,254 | 4/1979 | Schussler et al. | 179/2 TV |
| 4,163,254 | 7/1979 | Block et al. | 358/122 |
| 4,289,930 | 9/1981 | Connolly et al. | 179/2 TV |
| 4,363,108 | 12/1982 | Lange et al. | 340/790 |
| 4,451,701 | 5/1984 | Bendig | 179/2 TV |
| 4,456,925 | 6/1984 | Skerlos et al. | 358/85 |
| 4,499,568 | 2/1985 | Gremillet | 369/30 |
| 4,560,833 | 12/1985 | Weber et al. | 179/2 TV |
| 4,581,484 | 4/1986 | Bendig | 379/67 |
| 4,720,849 | 1/1988 | Tayama | 379/90 |
| 4,734,765 | 5/1988 | Okada et al. | 358/102 |
| 4,734,856 | 3/1988 | Davis | 364/300 |
| 4,751,578 | 6/1988 | Reiter et al. | 358/183 |
| 4,845,636 | 7/1989 | Walker | 364/479 |
| 4,873,662 | 10/1989 | Sargent | 364/900 |
| 4,894,717 | 1/1990 | Komei | 358/108 |
| 4,932,826 | 6/1990 | Moy et al. | 414/277 |
| 4,942,616 | 7/1990 | Linstroth et al. | 381/51 |
| 5,001,554 | 3/1991 | Johnson et al. | 358/86 |
| 5,025,373 | 6/1991 | Keyser, Jr. et al. | 364/408 |
| 5,083,272 | 1/1992 | Walker et al. | 364/412 |
| 5,089,885 | 2/1992 | Clark | 358/86 |

OTHER PUBLICATIONS

Article appearing in the Nov. 9, 1990 issue of the Wall Street Journal, p. R44, entitled "Information, Please".
Article appearing in Apr. 7, 1991 issue of N.Y. Times, p. D7, entitled "Phones Getting Smarter with Built-In Computer".

Primary Examiner—Alyssa H. Bowler
Assistant Examiner—Alpesh M. Shah
Attorney, Agent, or Firm—Morgan & Finnegan

[57] ABSTRACT

The invention relates to an inexpensive telecommunications device utilizing existent components located in the home or office, such as a television receiver and a telephone, for creating an interactive display terminal for accessing information stored in remote computer databases. In one embodiment according to the invention, the terminal is configured with the necessary logic components to communicate with a host computer system via telephone lines. Alternatively, the device may be directly connected to an inhouse data retrieval network. The terminal is software controlled at the host database and can be dedicated to a particular host computer database system, or may be utilized with various host systems. A multiple screen memory, which is programmable at the host database, may be utilized for storing multiple television screens of information. Peripheral components, such as a printer or disk drive, may be attached to the terminal. The device, when disconnected from the host database, may be programmed to operate in a stand-alone capacity. A data compression technique is employed to reduce the communication time between the host computer system and the terminal.

18 Claims, 2 Drawing Sheets

INTERACTIVE TERMINAL FOR THE ACCESS OF REMOTE DATABASE INFORMATION

FIELD OF THE INVENTION

The invention broadly relates to a low cost terminal for the interactive access of information from computerized host databases, and more particularly, to a low cost telecommunications terminal having a telephone interface to access information over telephone lines, which uses a telephone keypad to control the terminal, and a display device to display the information.

BACKGROUND OF THE INVENTION

In recent years, there has been a marked surge in the popularity of numerous commercial database systems, such as the Prodigy ® data retrieval service. These database services provide various information and popular services that may be sought by the public-at-large, such as travel information, news retrieval, or stock quotation indices. The computerized databases are designed to be accessed by end-users from the home or office.

In a typical database system, the desired information is accumulated at a host computer system or network, in which the information is stored in databases or files that may be accessed by the end-user. In order to access this information or to use the services provided by the host computer network, a retrieval terminal or some other means to access information from the remote host database is required by the end-user.

Systems have been previously developed for accessing computerized databases through a telephone communication network by an apparatus that implements telephone functions and displays the requested data on a display monitor. As an example, Sargent (U.S. Pat. No. 4,873,662) discloses a system for displaying information retrieved over a telephone network on a terminal apparatus. Bendig (U.S. Pat. No. 4,451,701) similarly proposes a system for providing interactive communication with a remote database over a telephone exchange, which utilizes a television receiver to display the data retrieved. Schussler et al. (U.S. Pat. No. 4,150,254) also relates to another system for displaying information received from a remote data bank via a telephone exchange, on a user's television receiver.

However, the above-mentioned systems suffer a number of drawbacks. All of these systems require an additional peripheral device (and its associated cost) in order to utilize and control the operation of the device. The prior systems that utilize the telephone keypad as a control means do so only to establish connection to a remote database. Consequently, the necessary addition of a peripheral keyboard or keypad to control the terminals inevitably increases the expense of these known systems.

Furthermore, in several of the prior systems, and specifically the Sargent and Schussler et al. systems, the display device that is utilized does not comprise a readily available component (for example, a conventional television receiver) but rather entails a modified or specifically equipped display device. The use of such a specialized display device inevitably increases the cost of the overall system to the consumer/user.

An additional drawback of the previously-known systems is that they lack a reprogrammable memory capability. A system without such a feature pocesses significant limitations. For example, any required future enhancements, repairs or modifications to the units must be serviced by field personnel, or recalled from the consumer marketplace back to the manufacturer for such changes. Such a costly servicing of the prior systems may be avoided, in many cases, if a reprogrammable memory capability had been available, which would allow modifications to be easily implemented from a remote location. Thus, the lack of programmable memory leaves the systems wanting in expansibility due to their inflexibility.

Finally, these known systems are not designed to be used principally with existing accessory devices already possessed by the consumer, such as a telephone and television receiver. This would advantageously serve to render the device inexpensive.

As is known, home personal computers are often employed as a database access means By connecting the personal computer to an external modem, the end-user is able to telephonically access information located in the host computer database. In fact, the recent popularity and increased use of personal home computers by the public-at-large has fueled the development and expanded use of commercial database systems.

Although providing a feasible way for accessing the stored information, the home computer/modem/monitor combination presents a number of significant drawbacks. For example, although the cost of home computers has significantly decreased over the years, the purchase price of most computers may be a deterrent for the average consumer who might consider subscribing to a commercial host database system. Moreover, there are occasions when the potential end-user of the host database system has no need or desire to purchase a personal computer other than for accessing the database system. The purchase of a home computer is thereby rendered impracticable for such an end-user.

Additionally, certain required peripherals, such as an external modem and display monitor, must be purchased separately from the computer. These additional components are necessary to enable the computer to access and display the information retrieved from the host database. Thus, the cost to the consumer is further increased.

The above described cost barrier presents significant problems for host database operators, in that the potential market for end-users of the database system is significantly reduced. Because host database operators have had a somewhat limited market for offering their information or system database services, subscription costs to the end-users currently subscribing to such services has remained at an inflated level. Thus, many potential subscribers who would normally subscribe to a commercial database service will not do so because of the cost of using the service.

There are other concerns related to using personal computers as the access terminal. It would be advantageous for the host database operator to prevent unauthorized end-users from accessing the database. Also, it would be more cost efficient if host operators could vary the advertising viewed by the end-user each time the end-user logs onto the database system. Although achievable with current personal computers, it is necessary to include extra components with the system, which further adds to the cost to the end-user.

Apart from the stated concerns directed towards the access of information stored in remotely located commercial host database systems, it has become typical of businesses or other organizations to create "in-house" information databases. Typically, the database is stored at a centralized computer location. The stored information is shared or accessed by the direct connection of personal computers to the central computer. This is exemplified, for example, by a "LAN" network.

However, in order for the individual employees to make the most effective use of the information found in those centralized computers, corporations must invest significant capital to purchase a sufficient number of access terminals. This is often cost prohibitive to the business. Thus, the corporate database may not be used at its maximum efficiency, thereby placing an added financial burden onto the corporation.

Because of the size or bulkiness of most home personal computers, host database systems are not currently accessible to the end-user in certain desirable locations. For example, in the limited space environment of commercial airliners, automobiles, or even pleasure boats, there may be occasions when a passenger or occupant wishes to access information from host databases. However, space limitations aboard those craft prohibit the placement of a personal computer or similar unit.

Accordingly, it is an object of the present invention to provide an apparatus that is not complex in its use in order to facilitate the interactive access of information from computerized host databases for the ordinary consumer/user.

A more specific object of the present invention to provide a apparatus for the interactive access of information from computerized host databases that employs conventional embodiments such as a telephone and television for accessing and displaying the information retrieved.

It is a further object of the present invention to provide an apparatus for the interactive access of information from remote computerized databases that is compact in its size so as to not require much additional space.

It is still another object of the present invention to provide an apparatus which is capable of operating in a stand alone manner for interactively accessing and manipulating information from a computerized database.

Yet another object of the current invention is to provide a apparatus which may be programmably controlled and modified by a host database operator for interactively altering the accessing of information from a computerized database.

The foregoing objects and advantages of the invention are illustrative of those which can be achieved by the present invention and are not intended to be exhaustive or limiting of the possible advantages which can be realized. Thus, these and other objects and advantages of the invention will be apparent from the description herein or can be learned from practicing the invention, both as embodied herein or as modified in view of any variations which may be apparent to those skilled in the art. Accordingly, the present invention resides in the novel parts, constructions, arrangements, combinations and improvements herein shown and described.

SUMMARY OF THE INVENTION

The above and other objects according to the invention is accomplished by providing a telecommunication terminal which utilizes technology presently available and commonly used. In one embodiment of the terminal according to the invention, the cost of achieving these objects is kept to a minimal level through the utilization of the end-user's own conventional television receiver and a push-button telephone as the display device and the communication link, respectively, connecting the terminal to the host database system The terminal may include a telephone interface for connecting to a push button telephone and for connecting the terminal to a communications exchange, a modem device, a central processing unit, a video signal generator, and a RF modulator, thereby providing display of information on the screen of an unmodified television receiver by simply connecting the output of the terminal to the cable/antenna terminals of the television receiver. In this regard, the elimination of a separate keyboard and video monitor constitutes a significant cost savings to the end-user.

Connection with a remote database, program selection and overall control of the terminal is accomplished through the simple use of the keypad of the telephone attached to the terminal, replacing the need for an expensive accessory keyboard. The invention, which contains the necessary logic circuitry, can communicate with a host computer base through a telephone line. Control software located at the host database is responsive to signals received from the keypad, allowing the end-user to control operation of the device and display the information and services offered by the database service.

Additionally, the device may include control software so as to program the terminal's registers and memory while the terminal is communicating with the host database, thereby allowing for future modification of the device. Communication between the terminal and the host database is further enhanced by the use of data compression and error detection/correction techniques.

In another embodiment, the terminal is directly connected to an in-house data storage location, providing a cost efficient means for retrieving information stored therein. It should be noted that because of the invention's compact size, it requires very little additional space, regardless of its application. Furthermore, when integrated with a mini-screen and push button telephone circuitry, the terminal can become a stand-alone device.

BRIEF DESCRIPTION OF THE DRAWINGS

The invention will be further described by way of reference to the following drawings, in which.

DETAILED DESCRIPTION OF THE DRAWINGS

Figure 1:
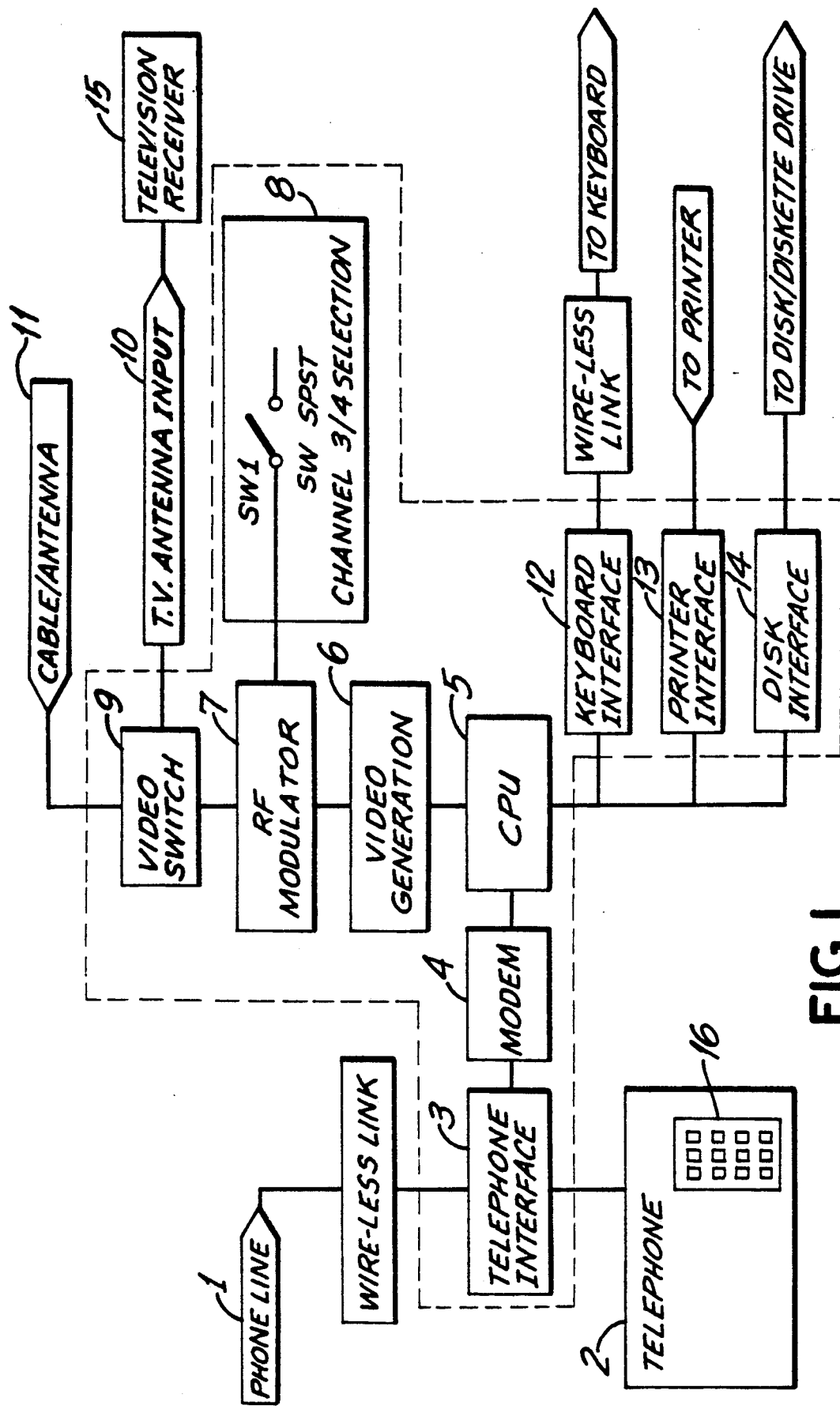
FIG. 1 is a block diagram illustrating the interconnection of the terminal, according to the invention, to external components so as to create an interactive work station.

Referring now to the drawings, wherein like numerals refer to like components, there is disclosed in FIG. 1 a block diagram related to the general arrangement of the components comprising the various embodiments of a low cost telecommunications terminal 17 ("terminal" or "LCT") according to the invention.

The terminal 17 may include, for example, a telephone 2 having, but not limited to, a twelve key keypad 16 with appropriate tone addressing circuitry. The telephone 2 may be connected by an acoustic coupler to a telephone interface 3, or alternatively it may be connected serially or in parallel by wire to a telephone interface 3. Because the terminal 17 may function when the telephone 2 is connected either in a serial or in a parallel mode, it is not required that the telephone 2 be connected directly to the telephone interface 3 of the terminal 17 to operate (as in a serial mode), but only that the telephone 2 be connected to any telephone jack of the subscriber's telephone line 1 to which the terminal 17 is connected (as in a parallel mode). For example, in serial mode, the telephone 2 may be connected directly to the terminal 17 which in turn is connected to a telephone jack of the subscriber's telephone line 1. Alternatively, in parallel mode, the terminal 17 may be placed in a separate location from the telephone 2, as long as both the terminal 17 and the telephone 2 are connected to the same subscriber telephone line 1, whereby the terminal 17 would still be coupled to the telephone 2.

Advantageously, the telephone keypad 16 serves as a keyboard for allowing the end-user of the database system to selectively control the operation of the terminal 17. Alternatively, a keypad individually adapted for use with the terminal 17 may also be employed. For example, one may use a tone generating keypad (not shown) in lieu of, or in addition to, the telephone keypad 16. The keypad 16 may be either directly hardwired with the terminal 17; or it may be remotely coupled as by use of radio waves. As will be further explained, control software provided by the host database responds, under the control of the terminal 17, to the tones created by the keypad 16 in order to operate the terminal 17.

The telephone interface 3 of the terminal 17 may comprise, for example, a FCC part #68 approved data access arrangement ("DAA"). The DAA includes a standard internal dual tone multi-frequency ("DTMF") decoder IC for data/voice communication. The DAA may further contain standard circuitry, known to those skilled art, for polarity protection and level detection of the telephone line. The DAA may also contain 2 to 4 wire translation and/or equalization to permit full duplex operation over the subscriber's telephone line 1.

An internal semiconductor device or a mechanical relay (not shown), under the control of a CPU5 commutates the telephone 2 and the coupled DTMF decoder onto and off of the subscriber telephone line 1. Additionally, the telephone interface 3 may include voltage limit circuitry (not shown) for preventing or minimizing line surge damage.

An individual telephone line connects the telephone interface 3 to the telephone company's terminal jack (not shown) of the subscriber's telephone line 1 so that the terminal 17 may communicate with a remote host data base. This connection may be accomplished either by a hardwire connection or by means of a wireless remote coupling using technology familiar to one skilled in the art. The terminal 17 may function with, for example, either a pulse dialing or tone dialing subscriber telephone line, or an ISDN type line. Alternatively, a private branch telephone exchange system ("PBX") providing telephone switching in an office or building may also be employed.

Notably, the terminal 17 also features an internal modem 4 so that the terminal 17 may communicate and transmit information to and from the host database via the subscriber's telephone line 1. The modem 4 may carry asynchronous or synchronous data from the subscriber's telephone line 1 and through the DAA, where it is then converted to digitally encoded information for use by the CPU5 (described below). Alternatively, the modem 4 will convert the digital information presented from the CPUS into low frequency analog signals for the DAA to transmit to the host database via the subscriber's telephone line 1.

The modem 4 may be constructed using known low cost electronics for performing standard modulation techniques, in either full or half duplex mode. These modulation techniques may include, but are not limited to, amplitude, frequency ("FSK") and phase ("PSK") modulation. The modem 4 may comprise, for example, standard industry models such as a 300/1200 baud modem conforming to either Bell 212A, Bell 103, Bell 202 or international protocol V.22, V.21., but it will be apparent to one skilled in the art that the particular model or type of modem employed is not so limited.

A central processing unit ("CPU") 5, microprocessor IC, or other commonly-known, commercially available microcomputer device, serves to control the overall operation of the terminal 17. The particular CPU5 which is used may include, but is not limited to, read-only (ROM) and random access (RAM) memory arrays. The RAM memory, which may be volatile or non-volatile, may serve the function of storing both the data transmitted from the host database that is displayable to the end-user and the programming information that is manipulated by the CPU5 itself. Advantageously, all of the memory contents, that is, both the ROM and RAM memories, may be programmably altered by the host software. The memory storage arrays may consist of either dynamic or static technologies; however, both types of technologies may co-exist according to design considerations. It should be understood that while a preferred embodiment of the present invention may employ both ROM and RAM memory technologies, other memory storage techniques may be employed, depending upon the memory units utilized.

The memory storage circuitry may vary, according to need or desire. For example, the memory may include only battery-backed RAM. Moreover, any type of conventional electronically erasable/alterable and programmable read only memory arrays ("EEPROM" or "EAPROM") may also be utilized, thereby providing an alternative to ROM storage ICs.

The CPU5 may further include various timers, data and memory management means, and addressing circuitry known to those skilled in the art; input/output circuitry for enabling the CPU5 to communicate with the various other components that comprise the terminal 17; and serial and parallel interfaces (12, 13, 14) for attaching peripheral components to the terminal 17, such as a keyboard, printer or a disk drive device (not shown).

The video generation unit 6 (or "video generator") includes a video processor which receives digital signals from the CPU5 and converts ("encodes") the digital signals into corresponding video signals, including, but not limited to NTSC, HDTV or IDTV compatible video signals. As later discussed in greater detail, the video signals are transmitted to an RF modulator 7 for radio frequency modulation. The signals are thereby converted for output to a standard television set or compatible monitor.

The video processor may contain, for example, a character generator, character memory, programmably alterable buffer memory, scan line counters, and vertical and horizontal timing generators. Further, the video generator 6 may also include row/table addressing circuitry, color specification bits, character attribute control, intensity controls, local scan delay counters, and row or column offset counters.

The output signal from the video processor is inputted to a video summing circuit which combines the various sync, intensity and data information for the signal. The video summing circuit may comprise circuitry known to those skilled in the art. The values used for the various counters, generators, and controls may be contained in software settable registers or buffer memory internal to the terminal 17, which are configurable from the CPU5 under the control of the host software. Alternatively, these values may permanently reside within the circuitry of the video processor. It will be apparent to those skilled in the art that the video processor implements all of the logic functions required for the generation of the necessary timing signals and video output signals. Likewise, commonly used video terminal attributes are supported by the video processor including display refresh, data update functions and display character RAM for external character generation.

A radio frequency ("RF") modulator 7, preferably of the type commonly encountered by those skilled in the art but not so limited, receives the encoded video signal from the video generator 6 and modulates the signal using standard RF techniques to produce an output television signal. The output signal may comprise, for example, a composite video signal which is amplitude modulated and an audio signal which is frequency modulated, tuned to any desired frequency. In one mode, the output signal is modulated to 61.3MHz or 67.3MHz (commonly known as channel 3 or 4) for input to a television receiver 15. Alternatively, the output signal may entail separate video and audio output signals, thereby allowing separate output of the video signal to VCR's or monitor type television sets. A switch 8 may be employed to switch the output signal between channels 3 and 4, unless the mode of operation of the terminal 17 utilizes a different output frequency. For example, an output signal modulated in the range of the 910-918MHz bandwidth permits the use of a radio waves means to communicate between the terminal 17 and a television receiver 15, thereby eliminating the use of switch 8.

Advantageously, the RF modulator 7 may contain color processing circuits to allow for the generation of color-encoded data. The RF modulator 7 receives such color data information from the video generator 6. The RF modulator 7 may also contain vestigial sideband filter circuitry for filtering undesirable signal components.

The RF modulator 7 unit may further include a switch 9 for switching the signal input to the television receiver 15 between either the signals transmitted from the terminal 17 and signals transmitted from a typical cable/antenna (not shown) attachment to the television receiver 15. The switch 9 is controlled by the CPU5, and contains high frequency switching circuitry common to one skilled in the art.

The terminal 17 may also include several peripheral interfaces. Any of these interfaces may be configured according to current industry standards, or may be configured for custom peripherals. For example, one enhanced mode of the terminal 17 may include a keyboard interface 12, a printer interface 13, and a disk interface 14. The peripheral interfaces allow the terminal to be used with or without traditional computer peripherals, such as a keyboard, monitor and/or printer. Thus, in addition to use with a television receiver 15 and telephone 2, the terminal 17 may be used in a stand-alone capacity, similar to a personal computer. Even when such peripherals are not employed, however, the terminal 17 continues to function in a telecommunications capacity. In its preferred embodiment, the terminal 17 is designed to be used principally with a telephone 2 and television receiver 15, rendering the device inexpensive.

The operation of the terminal 17 will now be explained. In accordance with the present invention, the end-user, after turning on the LCT or terminal 17 unit, depresses a specific key on the telephone keypad 16 to initiate use of the terminal 17. Advantageously, the terminal 17 may be programmed such that the CPU5 may prevent operation of the terminal 17 unless and until a proper sequence of keys (e.g., corresponding to a "password") are depressed, thereby securing access to the terminal 17 only by persons entering the proper "password."

Upon gaining access to the terminal 17 the end-user may then enter the telephone number of the desired computer database, or alternatively, may make a selection from a preprogrammed list of automatically dialed computer databases that may appear on the display screen, by depressing the corresponding key on the telephone keypad 16. When any of the keys are depressed on the telephone keypad 16, the telephone interface 3 receives the keypad tone information and translates it into corresponding digital high and low level signal states which are well known to those skilled in the art. Of course, it is understood that the invention is not limited in operation to the use of such logic signal states described above, since those skilled in the art can readily adapt the various circuits to operate with other types of logic.

These digital signals from the telephone interface 3 are always presented to the CPUS. Advantageously, after the terminal 17 has been accessed by the end-user, the CPU5 may then selectively switch the telephone 2 coupled with the DTMF decoder off of the subscriber telephone line 1. Because the CPU5's functions also includes a dialing means and a telephone call dialing control means for initiating and maintaining a telephone call from the numbers entered into the keypad 16, the terminal 17 may then automatically dial and connect with a computer system's host database.

In one mode of operation, after access to the terminal 17 has been achieved, the telephone 2 along with the DTMF decoder is switched off and disconnected from the subscriber telephone line 1 circuit, and the DTMF tones are now translated and transmitted internally to the CPUS in order to control operation of the terminal 17. This permits the use of DTMF tones as a data communication means linking the telephone keypad 16 and the terminal 17, which signals are in turn relayed through the CPU5 to the remote host database in order to control the transmission of the desired information therefrom.

Accordingly, while commutated to the subscriber telephone line 1, the CPUS may in turn transmit the digital signals through the modem 4 and over the subscriber telephone line 1 to the host computer. Transmission of the signal to the host computer occurs, for example, when the end-user wishes to receive additional information from the database other than that already retrieved.

Likewise, the information received by the terminal 17 is then converted into digital information by the modem 4, processed by the CPU5, transformed into corresponding video signals by the video generator 6 and modulated for output to the television receiver 15 by the RF modulator 7. When accessed, the information will appear on the end-user's television receiver 15 or other display device. Individual screens of data are stored within the internal memory storage employed by the terminal 17.

The end-user is able to control the data screens so as to selectively scan the database by depressing certain keys on the telephone keypad 16. When directed by the end-user, the main menu, sub menu or other information may appear for further access by the end-user. The end-user can also direct the terminal 17 to print a hard copy of the screen to a peripheral printer when one is attached to the terminal 17.

Since each terminal 17 is provided with a reprogrammable memory capability, the terminal 17 may store multiple "screens" of video information and display these "screens" on the television receiver 15's screen when selected. Advantageously, the memory storage can be reprogrammed by the host system operator (through the host operator control software) at the time that the end-user is accessing the database. Such reprogramming would be transparent to the end-user.

For example, by dedicating a number of "screens" for reprogramming each time the terminal 17 accesses the database, the host database operator may display different messages, such as paid advertising or promotions, each time the end-user activates the terminal 17. Because of the increased advertising revenue that can be generated, the operating costs of the host database system can be reduced, which could be further passed on to individual end-users in the form of lower subscription fees. The subscription market for the database may thereby be increased.

Additionally, the internal operation of the terminal 17 can be reprogrammed by the host database operator. For example, internal program operation, communication tables and techniques, resident screen information, character generation fonts, figures or dots, may be remotely modified by the host database operator. In one example of this feature, the functions associated with specific keys of the keypad 16 may be altered by the control software, whereby the individual keys would now be altered to correspond to new or different database telephone numbers or selection offerings.

Advantageously, the controlling software that is utilized by the host operator also enables the host to control access to the different host databases according to identification means located within the individual terminal 17. In one mode of operation, the individual identification code of the terminal 17 may be located in the internal ROM of the terminal 17, but one skilled in the art will realize that placement of the individual identification means is not so limited.

Once the terminal 17 has been linked to a host database, the end-user would be presented with any information that the host system desires to provide for access. The database may be supplied, for example, by a sponsor publication in a particular market, or it may be supplied by a publication group in a regional or national market. This may include local, national, and international news retrieval; wire service information; weather; stock market or other market information; classified ads; retail shopping services; banking services; or any other information or service provided for the end-user within a local, regional or national area.

As exemplary of one proposed use of the terminal 17 according to the invention, the terminal 17 may be employed to retrieve news information stored in a newspaper's database. The end-user may activate the terminal 17 and access the database via, for example, a dedicated key on the telephone keypad 16. Upon connection with the news service database, the information (which may be tailored to the specific end-user) would be downloaded into the terminal 17 memory while the end-user scans through different screens of data by selectively depressing certain keys on the keypad 16.

Further access to information within an individual database may be controlled through a menu driven selection of topics. As discussed, host database operators are provided with control software so that the database may interactively communicate with the terminal 17 via the commands generated by the telephone keypad 16. To access a particular topic, the user may press the number on his or her keypad 16 corresponding to the desired menu selection. If a particular topic as selected contains sub-categories, such as advertisement classifications, a sub-menu or any other applicable information may appear to further define the end-user's request. Using the news retrieval example previously recited, an end-user may be presented with a topic menu comprising, for example, sports, international events, financial news, etc. The end-user, desirous of the previous night's football scores could depress a key corresponding to access of the sports subject located on the menu, and thereafter view the scores using sub-menus selected by the keypad 16.

Notably, the terminal 17 may function independently from the host computer. In one mode of operation, after the desired information is downloaded from the host database into the internal memory storage, the terminal 17 may be disconnected from the host computer system. The end-user may still scan and manipulate the information in the terminal 17's multiple "screens" of video information within the terminal 17, without requiring the interaction of the host computer system.

The terminal 17 may also be equipped with additional input/output interfaces such as would allow connection to various manufacturer's peripheral devices, game computers and personal computers. Thus, for end-users who already own a personal computer, the terminal 17 could substitute for a conventional modem to communicate data from the host database system to the personal computer.

Alternatively, in another embodiment of the invention, wherein the terminal 17 is primarily intended for "in-house" use, such as within the internal offices of a business, factory, etc., the subscriber telephone line may comprise a common hardwired network that is not connected to any telephone exchange. For example, the terminal 17 may be coupled to a remote database in another part of the company without using a telephone exchange system, but rather through the utilization of a simple hardwire connection. Thus, the terminal 17 would provide a cost-efficient replacement for personal computers or other types of terminals now employed for retrieving information from a company's in-house centralized database.

In another mode of operation, the terminal 17 may be programmed so as to monitor and record the telephone number and the length of time of all outgoing telephone calls placed on the subscriber's telephone line 1. Accordingly, such information could be later retrieved and displayed by the end-user, and perhaps be printed on a printer attached to the terminal 17.

The terminal 17 may also be programmed to monitor a telephone call while it is in progress, in effect acting as a speaker phone. This may be accomplished in a mode of operation whereby the terminal 17 allows the audio signals passing through the telephone interface 3 to the telephone 2 to also be transmitted through the terminal 17 to the speaker in the television receiver 15, thus permitting the telephone conversation to then be monitored.

The terminal 17 may further include a communications speed enhancer technique for reducing the transmission time for transmitting and receiving coded information over the subscriber's telephone line 1. Specifically, this data compression technique involves particular codes which contain a marker, a character and a repeat count, which are transmitted in place of repetitive data. This technique can be implemented by analyzing the data to be transmitted and creating a "token" table of repetitive words or phrases, based upon their occurrence in the data transmission.

In one mode of operation, the token table, which may be updated at any time, would reside in both the transmitter (host computer system, in one mode) and the receiver (the terminal 17, in the same mode) of the data link. Each repetitive or "token" phrase is assigned a separate code and is stored in the token tables in both the host computer system and the terminal 17. In essence, entire phrases or words are "compressed" into an associated code, and it is these codes that are transmitted in place of the entire phrase or word. Transmission time is thereby reduced. To identify the transmission of a token's code to the receiving unit, the code is preceded by a marker (an "esc" command, for instance).

As example of this data compression technique, the transmission of "111111" may alternatively be transmitted as "[esc][6][1]", whereby, "[esc]" would be the marker designating that the data following it is encoded, "[6]" would designate the repeat count, which is followed by the data that is to be repeated, herein coded as "[1]."

Advantageously, the transmission of an entire phrase such as "Enter your account number" may likewise be compressed by assigning a code to the phrase as a whole. For example, the code "1" may designate this phrase and would be stored in the token tables of both the receiver and transmitter. The transmission of this entire phrase would then only require the transmission of [esc][1], significantly reducing the amount of data necessary to be transmitted. Through the use of the token table on the receiving unit, the original phrase is reconstructed without any loss of data. Additionally, the terminal 17 may also be programmed to employ data error detection/correction techniques common to one skilled in the art to ensure accurate transmission of any and all data over the subscriber's telephone line 1.

Figure 2:
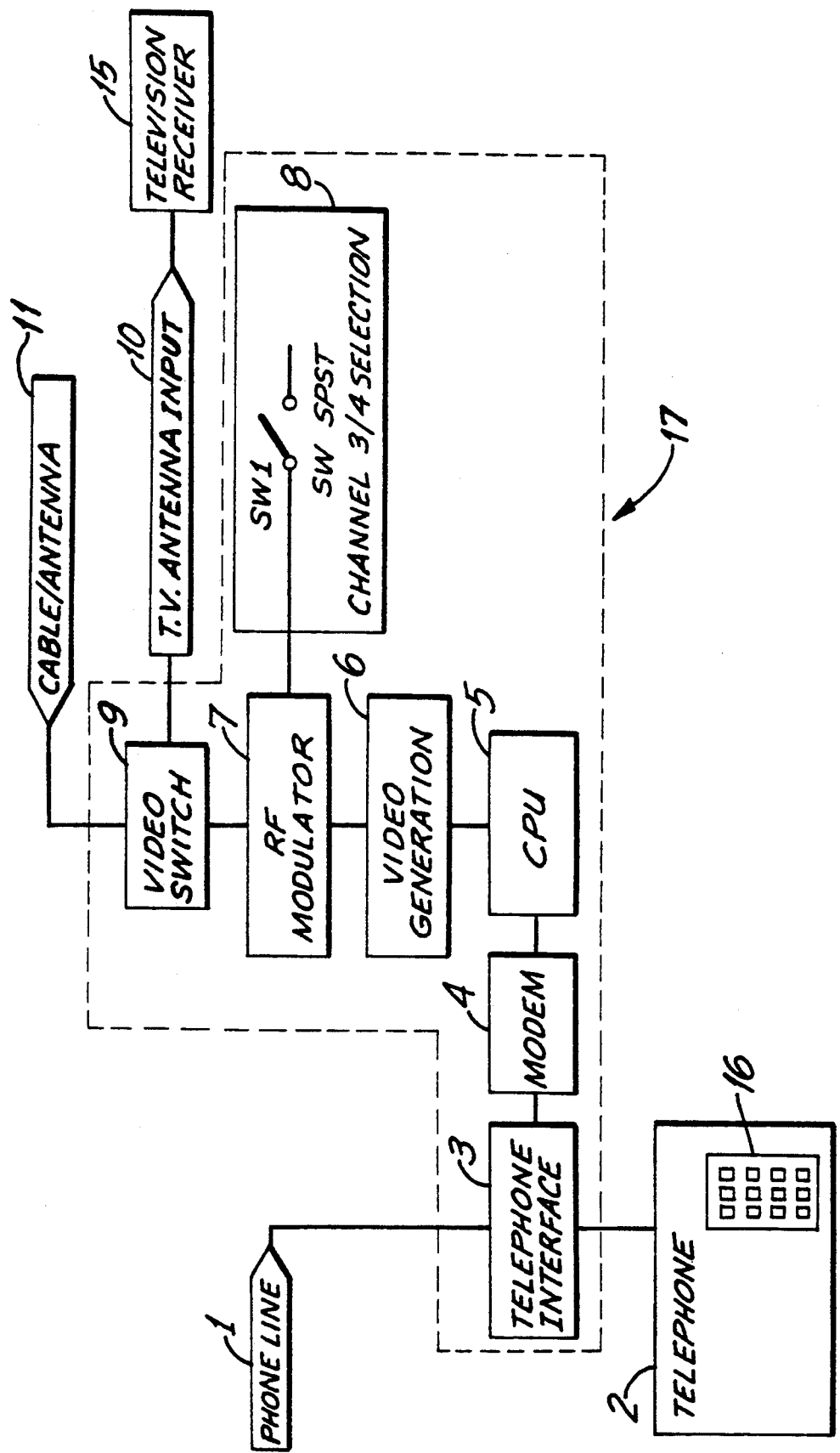
FIG. 2 is a block diagram of the primary components of one embodiment of the communications terminal according to the present invention.

In FIG. 2, the components corresponding to those of FIG. 1 have the same reference numerals as in FIG. 1. FIG. 2 is a diagram illustrating the invention in a basic design, without some of the features described in the enhanced embodiment depicted in FIG. 1. Specifically, the embodiment illustrated by FIG. 2 shows the terminal 17 as described above, but without any of the peripheral interfaces such as the keyboard interface 12, the printer interface 13 or the disk interface 14. Additionally the telephone interface 3 is hardwired to the terminal jack (not shown) of the subscriber's telephone line 1. Insofar as the operation of FIG. 2 is the same as FIG. 1, it need not be described.

From the foregoing discussion, it will be obvious that numerous modifications, substitutions and equivalents will now occur to those skilled in the art, all of which fall within the spirit and scope contemplated by the invention. Accordingly, it is intended that the invention be limited only by the scope of the appended claims.

What is claimed is:

1. A telecommunications device for creating an interactive terminal for accessing information from a remote computerized database using a communication exchange, wherein said interactive terminal is coupled to a home television receiver for displaying information retrieved from said computerized database, said television receiver having an input port, and to a telephone coupled to said communication exchange, said telephone having one or more keys for generating selective DTMF output signals, wherein said interactive terminal comprises:

interface means coupled to said telephone and to said communication exchange for communicating and receiving communication signals including carrier based signals over said communication exchange, said interface means responsive to receiving said selective DTMF output signals generated by said telephone for selectively uncoupling said telephone from said communication exchange and allowing a user to locally manipulate said information contained in said interactive terminal after it is retrieved from said remote database;

modem means coupled to said interface means for retrieving and converting said carrier based signals corresponding to said information from said remote database into digitally encoded data signals, and for converting digitally encoded data signals into carrier based signals for transmission via said communication exchange to said remote database;

control means coupled to said modem means for operating said telecommunications device, said control means responsive to said digitally encoded data signals from said modem means;

said control means further comprising programmable memory means for storing said digitally encoded data signals; and video signal processing means coupled to said control means for converting said digitally encoded data signals into corresponding video data signals for transmitting to said television receiver said video data signal.

2. A telecommunications device according to claim 1, wherein said interface means includes a switching means for switching said telephone onto and off of said communications exchange such that said selective output signals are still received by said control means when said telephone is switched off of said communications exchange.

3. A telecommunications device according to claim 1, wherein said database employs control software responsive to said carrier based signals transmitted by said modem means via said communication exchange.

4. A telecommunications device according to claim 1, wherein said programmable memory means includes a first memory storage having control signals programmably alterable under the control of said computerized database.

5. A telecommunications device according to claim 1, wherein said control means includes a keyboard.

6. A telecommunications device according to claim 1, wherein said control means includes a disk storage device.

7. A telecommunications device according to claim 1 wherein said control means includes a printing device.

8. A telecommunications device according to claim 1, wherein said control means includes a second memory storage for storing a coded signal corresponding to an individual identification of said telecommunications device for controlling access to said computerized database.

9. A telecommunications device according to claim 8 wherein said control means includes mans for programmably altering contents of said second memory storage under the control of said computerized database.

10. A telecommunications device according to claim 1, further including a radio frequency modulating means coupled to said video processing means for receiving and modulating said video data signals over a carrier frequency, said radio frequency modulating means having a tuning circuit for tuning said modulated video signal across various frequencies; and a switching means coupled to said video processing means, to a broadcast/cable exchange, and to said input port of said display device wherein said switching means is controlled by said control means and is responsive to said video data signal for transmitting to said display device said modulated video signal or broadcast signals received from said broadcast/cable exchange.

11. A telecommunications device according to claim 1, wherein said selective output signal is a multi-frequency signal.

12. A telecommunications device for creating an interactive terminal for accessing information from a remote computerized database using a communication exchange, wherein said interactive terminal is coupled to a television receiver for displaying information retrieved from said computerized database, said television receiver having an input port; said interactive terminal comprising:

a telephone keypad having a plurality of keys for generating output signals corresponding to said keys when selected;

interface means coupled to said telephone keypad and to said communication exchange for communicating and receiving communication signals including carrier based signals over said communication exchange, said interface means responsive to receiving said output signals generated by said keypad means for selectively uncoupling said keypad from said communication exchange and allowing a user to manipulate said information after it is retrieved from said database;

modem means coupled to said interface means for retrieving and converting said carrier based signals corresponding to said information from said remote database into digitally encoded data signals, and for converting digitally encoded data signals into carrier based signals for transmission via said communication exchange to said database;

control means coupled to said modem means for operating said telecommunications device, said control means having a plurality of peripheral interfaces for supporting input/output devices, said control means responsive to said digitally encoded data signals;

programmable memory means coupled to said control means for storing said digitally encoded signals;

video signal processing means coupled to said control means for converting said digitally encoded data signals into corresponding video data signals including character generation; radio frequency modulating means coupled to said video processing means for receiving and modulating said video data signals over a carrier frequency, said radio frequency modulating means having a tuning circuit for tuning said modulating video signal across various frequencies; and switching means coupled to a broadcast/cable exchange, to said input port of said television receiver and to said radio frequency modulating means, wherein said switching means is controlled by said control means and is responsive to said modulated video signal for transmitting to said television receiver said modulated video signal or broadcast signals received from said broadcast/cable exchange.

13. A telecommunications device according to claim 12, wherein said database employs control software responsive to said carrier based signals transmitted by said modem means via said communication exchange.

14. A telecommunications device according to claim 12, wherein said programmable memory means includes a first memory storage having control signals programmably alterable under the control of said computerized database.

15. A communications device according to claim 12, wherein said modem means includes means for implementing amplitude modulation, frequency modulation, and phase modulation.

16. A telecommunications device according to claim 12 wherein said control means includes a second memory storage for storing a coded signal corresponding to an individual identification of said telecommunications device for controlling access to said computerized database.

17. A telecommunications device according to claim 16 wherein said control means includes means for programmably altering the contents of said second memory storage under the control of said computerized database.

18. A telecommunication device according to claim 12, wherein said keypad means is a keypad of a telephone coupled to said interactive terminal.

* * * * *